(12) United States Patent
Radhakrishnan et al.

(10) Patent No.: US 8,891,813 B2
(45) Date of Patent: Nov. 18, 2014

(54) MEDIA FINGERPRINTS THAT RELIABLY CORRESPOND TO MEDIA CONTENT WITH PROJECTION OF MOMENT INVARIANTS

(75) Inventors: Regunathan Radhakrishnan, San Bruno, CA (US); Claus Bauer, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 608 days.

(21) Appl. No.: 13/128,967

(22) PCT Filed: Nov. 17, 2009

(86) PCT No.: PCT/US2009/064760
§ 371 (c)(1),
(2), (4) Date: May 12, 2011

(87) PCT Pub. No.: WO2010/057171
PCT Pub. Date: May 20, 2010

(65) Prior Publication Data
US 2011/0216937 A1 Sep. 8, 2011

Related U.S. Application Data

(60) Provisional application No. 61/115,442, filed on Nov. 17, 2008.

(51) Int. Cl.
*G06K 9/00* (2006.01)
*G06T 1/00* (2006.01)
*G06F 17/30* (2006.01)
*G06K 9/52* (2006.01)
*G06K 9/46* (2006.01)

(52) U.S. Cl.
CPC ............ *G06T 1/0028* (2013.01); *G06T 1/005* (2013.01); *G06F 17/30799* (2013.01); *G06K 9/525* (2013.01); *G06K 9/4671* (2013.01); *G06K 9/00744* (2013.01)
USPC ........................................................ 382/100

(58) Field of Classification Search
None
See application file for complete search history.

(56) References Cited

U.S. PATENT DOCUMENTS

| 5,870,754 | A | 2/1999 | Dimitrova |
| 6,996,273 | B2 | 2/2006 | Mihcak |
| 7,755,349 | B2* | 7/2010 | James .................. 324/207.13 |
| 8,644,622 | B2* | 2/2014 | Perronnin et al. ............ 382/218 |

(Continued)

FOREIGN PATENT DOCUMENTS

| CN | 1799049 | 7/2006 |
| WO | 2009/046438 | 4/2009 |

OTHER PUBLICATIONS

Mahdian, B. et al. "Detection of Copy-Move Forgery Using a Method Based on Blur Moment Invariants" vol. 171, Issue 2, pp. 180-189, Sep. 13, 2007.

(Continued)

*Primary Examiner* — Nancy Bitar

(57) ABSTRACT

A portion of media content is accessed. Components from a first and each subsequent spatial regions of the media content are sampled. Each spatial region has an unsegmented area. Each subsequent spatial region includes those within its area as elements thereof or the spatial regions may partially overlap. The regions may overlap independent of a hierarchical relationship between the regions. A media fingerprint is derived from the components of each of the spatial regions, which reliably corresponds to the media content portion, e.g., over geometric attacks such as rotation.

31 Claims, 5 Drawing Sheets

(56) References Cited

U.S. PATENT DOCUMENTS

| | | | |
|---|---|---|---|
| 2003/0169910 A1* | 9/2003 | Reisman et al. | 382/124 |
| 2009/0063277 A1 | 3/2009 | Bernosky | |
| 2009/0304082 A1 | 12/2009 | Radhakrishnan | |
| 2010/0205174 A1* | 8/2010 | Jiang et al. | 707/725 |
| 2010/0238350 A1 | 9/2010 | Radhakrishnan | |
| 2011/0022633 A1 | 1/2011 | Bernosky | |
| 2011/0035382 A1 | 2/2011 | Bauer | |
| 2013/0094724 A1* | 4/2013 | Al-Zahrani et al. | 382/125 |

OTHER PUBLICATIONS

Kozat, et al., "Robust Perceptual Image Hashing via Matrix Invariants" Proceedings of IEEE International Conference on Imaging Processing (ICIP) SIngapore, Sep. 2004, pp. 3443-3446.

Mihcak, et al., "A Perceptual Audio Hashing Algorithm: A Tool for Robust Audio Identification and Information Hiding" Proceedings of 4th International Information Hiding Workshop, Pittsburgh, PA, Apr. 2001, pp. 51-65.

Venkatesan, et al., "Robust Image Hashing" Proc. IEEE ICIP, Vancouver, Canada, Sep. 2000, pp. 664-666.

Hua, et al., "Robust Video Signature Based on Ordinal Measure" 2004 International Conference on Image Processing, pp. 685-688.

Bhat, et al., "Ordinal Measures for Image Correspondence", IEEE Transactions on Pattern Analysis and Machine Intelligence, vol. 20, No. 4, Apr. 1998, pp. 415-423.

Celentano, et al., "A FFT Based Technique for Image Signature Generation" SPIE vol. 3022, pp. 457-466.

Cheung, et al., "Efficient Video Similarity Measurement with Video Signature" IEEE Transactions on Circuits and Systems for Video Technology, vol. 13, No. 1, Jan. 2003, pp. 59-74.

Cheung, et al., "Estimation of Web Video Multiplicity" Part of the IS&T/SPIE Conference on Internet Imaging, San Jose, CA, Jan. 2000, SPIE vol. 3964, pp. 34-46.

Seo, et al., "A Robust Image Fingerprinting System Using the Radon Transform", Signal Processing: Image Communication, vol. 19, Issue 4, Apr. 2004, pp. 325-339.

Skrepth et al., "Robust Hash Functions for Visual Data: An Experimental Comparison" IbPria 2003, LNCS 2652, pp. 986-993, 2003, Springer-Verlas Berlin Heidelberg.

Lu, et al., "Robust Mesh-Based Hashing for Copy Detection and Tracing of Images" 2004 IEEE International Conference on Multimedia and Expo, pp. 731-734.

Mihcak, et al., "New Iterative Geometric Methods for Robust Perceptual Image Hashing" LNCS 2001, pp. 13-21.

Monga, et al., "Robust Perceptual Image Hashing Using Feature Points" 2004 International Conference on Image Processing, pp. 677-680.

Johnson, et al., "Dither-based Secure Image Hashing Using Distributed Coding" Proceedings IEEE International Conference on Image Processing, Spain Sep. 2003, pp. II-751-II-754.

Swaminathan, et al., "Image Hashing Resilient to Geometric and Filtering Operations" MMSP 2004.

Lefebvre, et al., "A Robust Soft Hash Algorithm for Digital Image Signature" ICIP 2003 pp. 495-498.

Fridrich, J.; Goljan, M.; , "Robust hash functions for digital watermarking," Information Technology: Coding and Computing, 2000. Proceedings. International Conference on , vol., no., pp. 178-183, 2000.

Radhakrishnan, et al., "Content-Based Video Signatures Based on Projections of Difference Images" Multimedia Signal Processing, 2007. MMSP 2007. IEEE 9th workshop on IEEE, Piscataway, NJ, US. Oct. 1, 2007, pp. 341-344.

Radhakrishnan, et al. "Video Fingerprinting Based on Moment Invariants Capturing Appearance and Motion" Multimedia and Expo 2009. IEEE International Conference Piscataway, NJ, USA, Jun. 28, 2009 pp. 1532-1535.

Cho, et al., "Very Fast Concentric Circle Partition-Based Replica Detection Method" Advances in Image and Video Technology, vol. 4872, Dec. 17, 2007, pp. 905-918.

Sastry, et al., "A Wavelet Based Multiresolution Algorithm for Rotation Invariant Feature Extraction" Pattern Recognition Letters, Elsevier, Amsterdam, NL, vol. 25, No. 16, Dec. 1, 2004, pp. 1845-1855.

Mahdian, et al. "Detection of Copy-move Forgery Using a Method Based on Blur Moment Invariants" Forensic Science International Elsevier Scientific Publishers Ireland Ltd., vol. 171, No. 2-3, Aug. 8, 2007, pp. 180-189.

Radhakrishnan, et al., "Robust Video Fingerprints Based on Subspace Embedding" Acoustics, Speech and Signal Processing, 2008. IEEE International Conference on IEEE, Piscataway NJ, USA, Mar. 31, 2008, pp. 2245-2248.

Alghoniemy, et al., "Image Watermarking by Moment Invariants" Image Processing, 2000. International Conference on Sep. 10-13, 2000, IEEE, Piscataway, NJ, USA, vol. 2, Sep. 10, 2000, pp. 73-76.

Schneider, et al., "A Robust Content Based Digital Signature for Image Authentication" 1996 IEEE, pp. 227-230.

Hu Ming-Kuei, "Visual Pattern Recognition by Moment Invariants" IRE Transactions on Information Theory vol. IT-8, pp. 179-187, year 1962.

* cited by examiner

250

Example Basis 300

MEDIA FINGERPRINTS THAT RELIABLY CORRESPOND TO MEDIA CONTENT WITH PROJECTION OF MOMENT INVARIANTS

CROSS-REFERENCE TO RELATED APPLICATIONS

This application claims priority to U.S. Patent Provisional Application No. 61/115,442, filed 17 Nov. 2008, hereby incorporated by reference in its entirety.

TECHNOLOGY

The present invention relates generally to media. More specifically, embodiments of the present invention relate to media fingerprints that reliably correspond to media content, e.g., with projection of moment invariants.

BACKGROUND

Media content is information that is embodied, stored, transmitted, received, processed, and used with at least one medium. For instance, audio information content is associated with audio media and video information content is associated with video media. A video medium may have associated audio information content, as well as video information content and may thus, at least sometimes, be considered an example of audio/visual (AV) media or so-called multimedia, mixed media, combined media and the like. As used herein, the terms "media content," "information content," and "content" may be used interchangeably.

Media content may be associated with a corresponding representation. Some representations of media content may be derived (e.g., computed, extracted) from information within, or which comprises a part of the media content. A media fingerprint embodies or captures an essence of the information content of the corresponding media and may be uniquely identified therewith. A media fingerprint, sometimes referred to as a media signature or a stream of media signatures, is an example of a media content representation. Video fingerprints are media fingerprints that may be derived from video media content. Audio (acoustic) fingerprints are media fingerprints that may be derived from audio media content (including audio media content within video media). As used herein, the term media fingerprint may refer to a low bit rate representation of the media content with which they are associated and from which they are derived.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
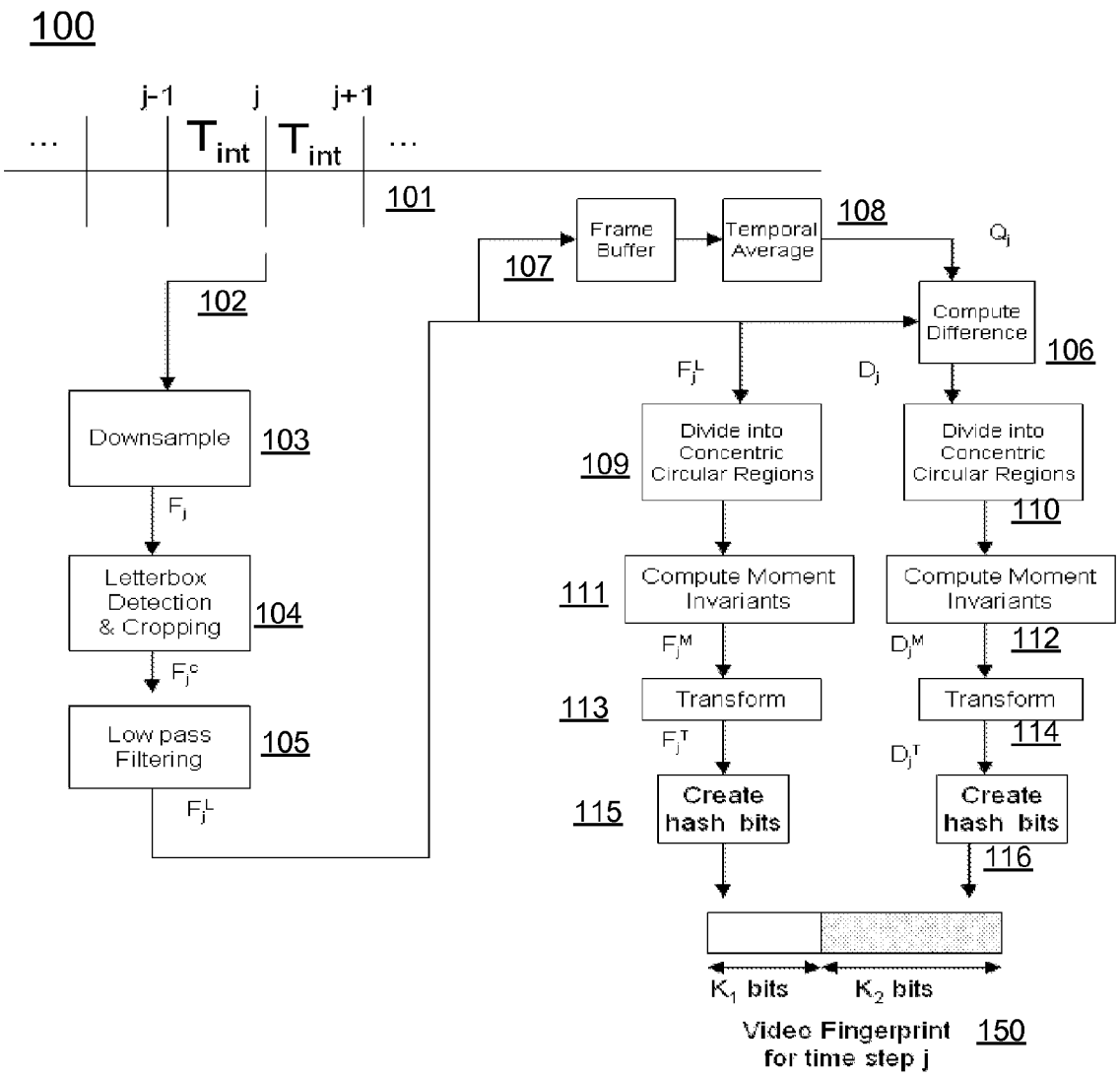
FIG. 1 depicts a first example procedure, according to an embodiment of the present invention.

Example embodiments, which relate to media fingerprints that reliably correspond to media content, e.g., with projection of moment invariants, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments of the present invention are described, which relate to media fingerprints that reliably correspond to media content, e.g., with projection of moment invariants. Media fingerprints may be described herein with reference to one or more example media, including video, graphical, and audiovisual and other multimedia. The selection of an example medium in this description may be made for simplicity and concise unity and, unless expressly stated to the contrary, should not be construed as limiting an embodiment to a particular medium. Embodiments of the present invention are well suited to function with video, audiovisual and other multimedia, graphical and other media. Furthermore, embodiments of the present invention are well suited to function with video media that displays video and graphical information that may be oriented in two or three spatial dimensions.

Overview of an Example Embodiment

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

A portion of media content is accessed. Components from a first and each subsequent spatial regions of the media content are sampled. Each spatial region has an unsegmented area. Each subsequent spatial region includes those within its area as elements thereof or the spatial regions may partially overlap. The regions may overlap independent of any hierarchical relationship that may otherwise or conceivably exist between the spatial regions. A media fingerprint is derived from the components of each of the spatial regions, which reliably corresponds to the media content portion, e.g., over geometric attacks such as rotation.

For an initial representation of a portion of media content of a temporally related group of content portions in a sequence of media content, quantized energy values are accessed for content elements. The quantized energy values are accessed over a matrix of regions into which the initial representation is partitioned. The initial representation may be downsampled to a lower resolution and cropped from the media content portion.

Media signatures that are computed (derived, extracted) according to embodiments of the present invention reliably correspond to the media content portions from which they are derived. The media fingerprints may thus be considered robust content portion identifiers, which are resilient to various signal processing operations on the media content. Media signatures computed according to an embodiment are substantially robust identifiers of media content that may be subjected to various signal processing operations. Some such signal processing operations may constitute attacks on the media content, possibly executed to access the content without rights or authorization to do so, as in media piracy. Signal processing may also or alternatively result from a variety of legitimate applications, as well (e.g., making a movie trailer from a video clip thereof for use by the studio in marketing the movie). Signal processing functions may change media content in one or more ways.

For example, media content may be changed by its subjection to geometric distortions or disturbances, such as stretching, cropping, or rotation, or to various other signal processing operations, such as compression, brightness scaling, spatial scaling and temporal manipulation, such as frame rate conversion or off-speed playout and/or re-recording. As used herein, the term media signature may refer to a bitstream that is representative of a content portion, such as a temporally discrete segment (e.g., a chunk) of a video or audio signal. Instances of an example segment video clip may exist in various states. A first video clip instance may have a native, substantially identical, natural, or raw state, in relation to an original instance thereof, and may thus exist in an essentially uncompressed format relative thereto. Additionally or alternatively, a second instance of the same video clip may be in a compressed state, relative to an original instance thereof, such as a bitstream from an encoder that is substantially compliant with the H.264/AVC-MPEG4 or MPEG3 codecs. Although the actual bitstreams representing the content and the associated underlying signals may differ for the uncompressed and the compressed formats, their corresponding video content may be perceived by a human of natural, substantially normal psychovisual skills as, for many practical purposes, essentially identical. Many modern audio codecs also function perceptually.

An embodiment functions to compute (derive, extract) signatures from each of the uncompressed and compressed formats or versions of the same media content, which themselves share significant similarity. Media signatures thus computed reliably capture an essence of media content to which they correspond and are substantially robust to various signal processing operations that may be performed on or over content data, which thus preserves continuing, robust correlation with the content associated therewith. Moreover, signatures computed according to an embodiment are strongly robust to geometric attacks such as rotation and/or cropping.

Embodiments may thus be used to identify modified versions of, e.g., copyrighted video clips. For example, a hypothetical original copyrighted content may have been modified by various signal processing operations such as compression, brightness scaling, frame rate conversion, geometric distortions etc. Signatures and fingerprints computed therefrom however are robust over such processing operations and thus in the presence thereof, or at least in part responsive thereto, robust against decorrelating with the content from which they are derived. Embodiments may thus reliably allow accurate or precise identification of original copyrighted content, even with signal processing modifications thereto.

For example, video signatures that are derived, computed, extracted, generated or the like according to an embodiment are useful for with applications that may identify modified versions of copyrighted video clips. An original instance of copyrighted, or otherwise protected or secured video content, may have been modified by various signal processing operations such as compression, brightness scaling, frame rate conversion, geometric attack such as rotation or cropping, or the like. Signatures derived according to an embodiment are substantially robust against such processing operations that may have been performed on or over video content. Thus, embodiments allow reliable identification of the original copyrighted content even after such processing related modifications.

An example embodiment functions over an input video signal with division of the video signal into temporally smaller chunks, which may or may not overlap. For each of the video data chunks, features are derived from, and represent the underlying content thereof. A signature, e.g., a relatively low-dimensional bitstream representation of the content, is formed therefrom. As used herein, the term signature, in relation to a media content portion such as a video chunk, may refer to the bitstream representation for that chunk of video data. As used herein, the term video fingerprint may refer to the set of all signatures for all chunks of a video file or other content portion and may thus apply in relation to an essentially entire input video signal. Signatures for each of the video chunks remain substantially similar, even where the content portion instances from which they are respectively derived are subjected to various signal processing operations. An embodiment thus functions based, at least in part, on similarity that may exist between signature features that are derived (sampled, extracted, computed) from various instances of given media content, whether uncompressed or compressed.

Conventional video signatures involve extraction of a video feature and creation of signature bits therefrom. Initially, the individual video frames are typically divided into regions, such as rectangular regions disposed with reference to a regular grid. Statistics are then computed over pixels in each region. However, registration differences, e.g., alignment offsets or other variation, may exist between the original video frame and modified video frame. Registration offset or variation may cause a difference between content within a region of the original frame and content within a corresponding region of the modified frame. Moreover, features extracted from the respective regions of the original and modified frames may be sensitive to the inclusion or exclusion of pixels into or out of the ostensibly corresponding regions.

Embodiments of the present invention however extract statistics, such as moment invariants, from at least partially overlapping frame regions, such as substantially concentric circular, elliptical, or other ellipsoidal regions. The overlapping frame regions from which the moment invariants or other statistics are extracted provide robustness against geometric operations, such as rotation or cropping, which may be performed on or over the content. For example, signatures derived according to embodiments of the present invention essentially capture or characterize how statistics, such as moment invariants, change across or over various frame regions, e.g., proceeding from an inner region to an outer region (or vice versa).

Nomenclature, Terms and Example Platforms

As used herein, the term "medium" (plural: "media") may refer to a storage or transfer container for data and other information. As used herein, the term "multimedia" may refer to media which contain information in multiple forms. Multimedia information files may, for instance, contain audio, video, image, graphical, text, animated and/or other information, and various combinations thereof. As used herein, the term "associated information" may refer to information that relates in some way to information media content. Associated information may comprise, for instance, auxiliary content.

As used herein, the terms "derive," "derived," "deriving" and the like may refer to sampling signal components of media content and/or computing, from the samples, a unique, corresponding signature or fingerprint thereof. Terms such as "extracting" signatures or fingerprints may thus also refer to deriving a media fingerprint.

As used herein, the term "media fingerprint" may refer to a representation of a media content file, which is derived from characteristic components thereof. Media fingerprints are derived (e.g., computed, extracted, generated, etc.) from the media content to which they correspond. As used herein, the term "video fingerprint" may refer to a media fingerprint associated with video media with some degree of particularity (although a video fingerprint may also be associated with other media, as well). Media fingerprints used in embodiments herein may correspond to video, image, graphical, text, animated audiovisual and/or other multimedia, other media information content, and/or to various combinations thereof, and may refer to other media in addition to media to which they may be associated with some degree of particularity. Media fingerprints may also correspond to audio content. As used herein, the terms "audio fingerprint" or "acoustic fingerprint" may relate to media fingerprints that are derived from components or characteristics of audio media content.

A video fingerprint may comprise a unique digital video file, the components of which are derived (e.g., computed, generated, written, extracted, and/or compressed from characteristic components of video content. Derived characteristic components of video content that may be compressed to form a video fingerprint corresponding thereto may include, but are not limited to, luminance or luma values, chrominance or chroma values, motion estimation, prediction and compensation values, and the like.

Thus, while media fingerprints described herein represent the media content from which they are derived, they do not comprise and (e.g., for the purposes and in the context of the description herein) are not to be confused with metadata or other tags that may be associated with (e.g., added to or with) the media content. Media fingerprints may be transmissible with lower bit rates than the media content from which they are derived. Importantly, as used herein, terms like "deriving," "generating," "writing," "extracting," and/or "compressing," as well as phrases substantially like "computing a fingerprint," may thus relate to obtaining media fingerprints from media content portions and, in this context, may be used synonymously or interchangeably.

These and similar terms may thus relate to a relationship of media fingerprints to source media content thereof or associated therewith. In an embodiment, media content portions are sources of media fingerprints and media fingerprints essentially comprise unique components of the media content. For instance, video fingerprints may be derived from (e.g., comprise at least in part) values relating to chrominance and/or luminance in frames of video content. The video fingerprint may also (or alternatively) comprise values relating to motion estimation, prediction or compensation in video frames, such as motion vectors and similar motion related descriptors. Media fingerprints may thus function to uniquely represent, identify, reference or refer to the media content portions from which they are derived. Concomitantly, these and similar terms herein may be understood to emphasize that media fingerprints are distinct from meta data, tags and other descriptors, which may be added to content for labeling or description purposes and subsequently extracted therefrom. In contexts relating to derivative media content, the terms "derivative" or "derive" may further relate to media content that may represent or comprise other than an original instance of media content.

Example embodiments may be described herein in relation to example video or other image related media content and video fingerprints associated therewith. However, embodiments of the present invention are well suited to function with audio media and multimedia that includes an audio component, and with audio ("acoustic") fingerprints associated therewith. Audio fingerprints may be derived from components or characteristics of audio media and audio-containing multimedia content such as audio spectrograms, which may be associated with the audio or multimedia content. It should be appreciated by artisans skilled in fields relating to media and fingerprinting that descriptions herein, while they may explicitly recite video or other image content, are thus applicably descriptive to audio media and audio containing multimedia, as well. Moreover, it should thus be apparent to artisans skilled in media related fields that descriptions herein in relation to deriving media fingerprints from video frame components are applicably descriptive of deriving audio fingerprints from audio spectrograms or other components or characteristics of audio media or audio-containing multimedia content, as well.

Example Derivation of a Media Fingerprint

Embodiments of the present invention extract statistics, such as moment invariants, from at least partially overlapping frame regions, such as substantially concentric circular, elliptical, or other ellipsoidal regions. The overlapping frame regions from which the moment invariants or other statistics are extracted provide robustness against geometric operations, such as rotation or cropping, which may be performed on or over the content. For example, signatures derived according to embodiments of the present invention essentially capture or characterize how statistics, such as moment invariants, change across or over various frame regions, e.g., proceeding from an inner region to an outer region (or vice versa).

Content within a media sequence may comprise multiple content elements. Video media for instance may comprise multiple video frames. Using a video medium for example, FIG. 1 depicts an example procedure 100 for extracting a content feature from a stream of media data, according to an embodiment of the present invention. In step 101, frames of the video sequence stream over time T, which may be segmented into intervals $T_{int}$. One or more time intervals $T_{int}$ may comprise a chunk of time $T_{chunk}$ that endures for the duration of a portion of the video sequence. Each interval $T_{int}$ is associated with a group of video frames, which comprise a portion of the video content that runs for the duration of the interval $T_{int}$. An interval $T_{int}$ may, for example, run from a first time instant j to a second time instant j+1. A time instant j−1 may precede time instant j. Thus, an interval $T_{int}$ from instant j−1 through instant j may precede the interval $T_{int}$ from j through j+1.

In step 102, media fingerprints are derived (e.g., computed, extracted) over each of the time Intervals $T_{int}$. An interval $T_{int}$ may be derived from a smallest frame rate conversion factor over which the media signatures may be expected to reliably correspond to frames of the original media content from which they are extracted. For example, where the speed of an original video sequence is at 30 frames per second (fps), and its video fingerprint is expected to reliably correspond to the original frame content over a frame rate conversion down to 12 fps, video fingerprints may be extracted every twelfth of a second; thus $T_{int}=\frac{1}{12}$ second. It should be appreciated that embodiments may function substantially without limitation to any given media element rate (e.g., video frame rate) or range thereof. A video frame Fj represents the closest video frame for time step j. The signature for time step j is thus derived (computed, extracted) based on features from (e.g., components of) frame Fj.

In step 103, frame Fj is downsampled to reference spatial resolution. For example, frame Fj may be downsampled to a reference spatial resolution of 120*160. Downsampling to a reference spatial resolution functions to allow an embodiment to effectively handle changes in spatial resolution that may be associated with an instance of video content. Where the aspect ratio is maintained, registration between the original video and spatially scaled video is also maintained.

In step 104, letterbox detection and removal from the input frame Fj, from which a sub-image is cropped. Letterbox detection may include searching a frame for a relatively strong horizontal edge, along with a frame region of approximately or essentially constant intensity (e.g., luma, luminance) values in the top (or bottom) of the frame. Detected letterboxes are removed. The active region of the frame that remains (e.g., after letterbox removal) is upsampled to the selected reference spatial resolution (e.g., 120*160). Moreover, a sub-image is cropped out from the downsampled frame Fj image.

Figure 2A:
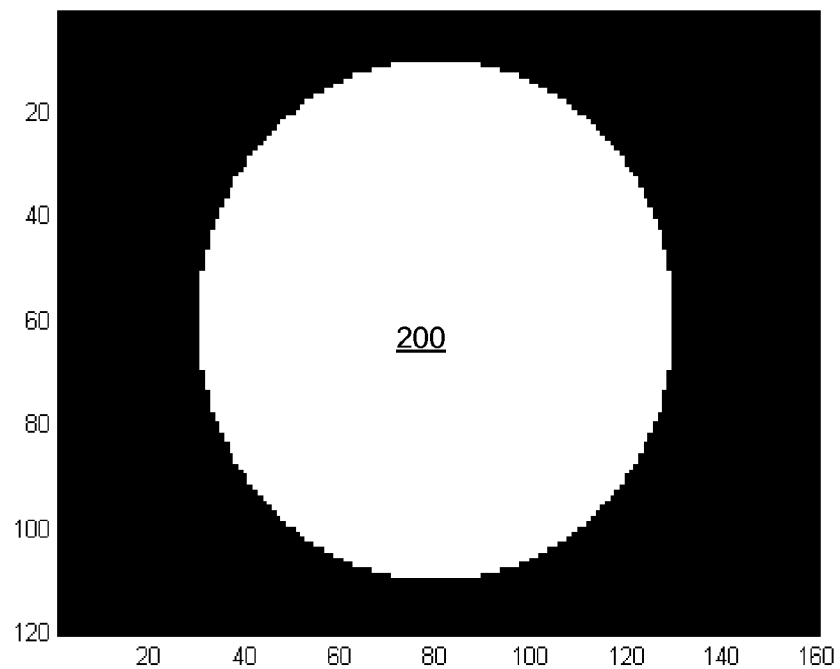
FIG. 2A depicts an example of cropped frame, according to an embodiment of the present invention.

FIG. 2A depicts an example of a region 200, cropped from a frame of video media content, according to an embodiment of the present invention The cropped out sub-image region may be selected to allow for features such as text overlay in a portion of the original picture and/or placement of graphics, logos or symbols in a particular region of the frame, such as proximate to the corners of the frame. Where the selected region contains no new graphics content, the fingerprint reliability of the processed video is not significantly affected. Frames of the processed content are represented as $F^c_j$. The region 200 cropped in step 104 may conform to virtually any shape. Regions cropped in an embodiment may conform to substantially ellipsoidal or ovoid like shapes, such as a circular region (or e.g., an elliptical or ovoid region) to bolster robustness against rotation based and/or other geometric attacks.

In step 105, low-pass filtering operation is performed over the content of frame $F^c_j$. Low pass filtering frame Fcj functions to improve the robustness of signature features derived (extracted, computed) therefrom. The degree of low-pass filtering over frame Fcj may balance the robustness associated with the signatures with processing and other computational costs, as well as with sensitivity to content. Low pass filtered image frames are represented with $F^L_j$. Relatively simple low-pass filtering may be implemented, for example, using the average of a 3*3 (or approximately similarly sized or configured) neighborhood of a current (e.g., reference) pixel. Alternatively or additionally, a degree of low-pass filtering may be chosen based on the analysis of the input frame. For example, a small amount of low-pass filtering may be used to preserve sensitivity in a frame of significant complexity, e.g., with a substantial number of detailed, information rich features. In contrast, a higher degree of low pass filtering may be used with frames with less complexity or detailed information. Moreover, the low-pass filtering described with reference to step 105, may be optional or omitted in an embodiment.

The low-pass filtered image $F^L_j$ captures the spatial configuration of pixels (e.g., image objects or features in the current video frame). In step 106, information relating to motion associated with image objects or features in the video frame content may be captured with a difference instance, e.g., a difference image $D_j$. The difference image $D_j$ may be computed according to Equation 1, below.

$$D_j(k,l)=Q_j(k,l)-F^L_j(k,l)$$

$$k=1,2\ldots H; l=1,2\ldots W; \quad \text{(Equation 1.)}$$

In Equation 1 above, W represents the width and H represents the height of the low pass filtered frame FLj. In the example (120*160) spatial resolution, W corresponds to a value of 160 and H corresponds to a value of 120, respectively. The term Qj represents a temporal average image, which is computed in step 108 with pixel values, averaged from a temporal window of frames that were previously decoded, e.g., from a time T through the present (e.g., contemporary) time instant j, which in step 107 may be stored in a frame buffer.

Values corresponding to the temporal average image Qj may be computed according to Equation 2, below.

$$Q_j(k,l) = \frac{1}{T}\sum_{i=j-T}^{j} F^L_i(k,l) \quad \text{(Equation 2.)}$$

$$k = 1, 2, \ldots H; l = 1, 2 \ldots W;$$

Computing the difference image Dj as a difference between the current frame FLj and a temporally averaged image (Qj) provides resilience to (e.g., robustness over) frame rate conversion, e.g., with which the video content may be attacked. Using the temporal average Qj deters dependence on a single frame. Upon computing the temporal average image in step 108 and the difference image in step 106, two solution matrices are generated, from which the signature features are derived (e.g., computed, extracted). A first matrix FLj essentially captures (e.g., represents) the appearance of the current decoded frame (FLj). A second matrix Dj captures motion aspects that are associated with the current frame (Dj). In steps 109 and 110, multiple regions are created in each of the current decoded frame, the values in matrix $F^L_j$ corresponding thereto, and the motion mapped current frame $D_j$, respectively.

In step 109, unsegmented, incompletely overlapping spatial regions corresponding to the matrices $F^L_j$ and $D_j$ are computed. The unsegmented, incompletely overlapping spatial regions may conform or substantially conform to virtually any configuration, shape or the like. For example, the unsegmented, incompletely overlapping spatial regions may conform to a circular or substantially circular, elliptical or substantially elliptical, ellipsoidal or substantially ellipsoidal, ovoid shaped or substantially ovoid configurations, shapes or the like.

Alternatively, or under some conditions or in some contexts, the unsegmented, incompletely overlapping spatial regions may conform to other than circular, elliptical, ellipsoidal, ovoid, or substantially circular, elliptical, ellipsoidal, or ovoid configurations, shapes or the like. For example, the unsegmented, incompletely overlapping spatial regions may conform or substantially conform, at least in part, to a rectangular or other polygonal configuration.

The unsegmented, incompletely overlapping spatial regions may have internal areas that are bounded by outer circumferences, contours, borders or the like, which may conform to virtually any configuration or orientation. For example, outer circumferences and at least a part of other contours or borders may be curved. Alternatively, or under certain conditions or circumstances, outer borders or contours may have one or more substantially straight edges.

Figure 2B:
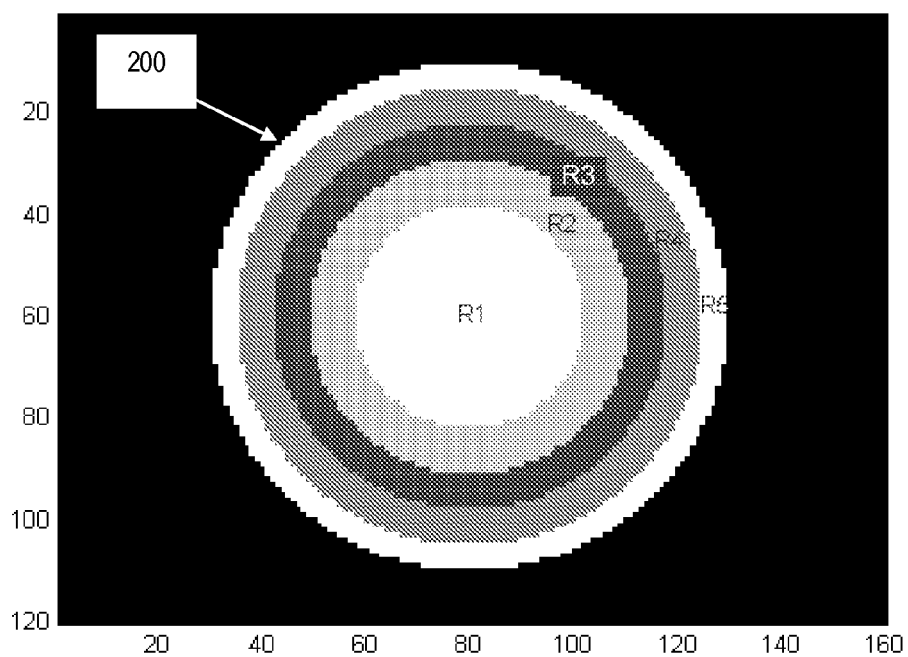
FIG. 2B depicts an example regionalized frame, according to an embodiment of the present invention.

FIG. 2B depicts an example of a regionalized frame 210, according to an embodiment of the present invention. Regionalized frame 210 essentially represents cropped frame region 200, as divided into multiple unsegmented regions that. The unsegmented regions, at least in part, overlap. Further, the unsegmented regions may share one or more geometric similarities, elements or relationships. Frame 210 may have an arbitrary positive whole number 'N' of regions, with a first region R1 as an innermost region and a region RN as the outermost region. In an example embodiment relating to FIG. 2B, N=5, and frame 210 represents region 200 as divided into five (5) concentric, circular or substantially circular, unsegmented regions R1, R2, . . . , R5, which have radii $r_1, r_2, \ldots, r_5$, respectively. Each of the unsegmented regions comprise (e.g., include, subsume) the other unsegmented regions that overlap therewith. Embodiments may also function with regions that conform to other than circular configurations.

As used herein, the term 'unsegmented' may relate to a quality or characteristic of uniformity, continuity, wholeness, non-separateness, regional identity, sectional unity, spatial homogeneity or the like. For example, region R1 comprises a single, unitary area that is free of division or sectionalization internal to itself. Similarly, each of regions R2-R5 comprise single, unitary areas that are each free of division or sectionalization within themselves. The terms 'internal to', as used herein with reference to or in the context of a region such as regions R1-R5, may relate to a spatial quality or characteristic that exists within the circumference, outer contour or external border of the region.

Region R5 comprises an unsegmented area of $\pi (r_5)^2$, which is free of division or sectionalization internal to itself. Radius $r_5$ of region R5 is greater than radius $r_4$ of region R4. Moreover, radius $r_4$ comprises a component of radius $r_5$. For example, $r_5=r_4+(r_5-r_4)$. Region R4 incompletely overlaps region R5 and comprises a component of region R5. Thus, region R5 comprises (e.g., includes, subsumes) region R4 in its totality.

Region R4 comprises an unsegmented area of $\pi (r_4)^2$, which is free of division or sectionalization internal to itself. Radius $r_4$ of region R4 is greater than radius $r_3$ of region R3. Moreover, radius $r_3$ may comprise a component of both radii $r_4$ and $r_5$. For example, $r_4=r_3+(r_4-r_3)$ and $r_5=[r_3+(r_4-r_3)]+(r_5-r_4)$.

Region R3 comprises an unsegmented area of $\pi (r_3)^2$, which is free of division or sectionalization internal to itself. Region R3 incompletely overlaps region R4, and thus also incompletely overlaps region R5 and comprises a component of both region R4 and region R5. Thus, region R4 comprises (e.g., includes, subsumes) region R3 in its totality and region R5 comprises both region R4 and region R3 in their totality.

Region R2 comprises an unsegmented area of $\pi (r_2)^2$, which is free of division or sectionalization internal to itself. Radius $r_3$ of region R3 is greater than radius $r_2$ of region R2. Moreover, radius $r_2$ may comprise a component of radii $r_2, r_4$ and $r_5$. For example, $r_3=r_2+(r_3-r_2)$ and $r_5=[r_2+(r_3-r_2)]+[r_3+(r_4-r_3)]+[r_4+(r_5-r_4)]$. Region R2 incompletely overlaps region R3, and thus also incompletely overlaps a portion of both region R4 and region R5 and comprises a component of regions R3, R4 and R5. Thus, region 3 comprises region 2 in its totality, region R4 comprises regions R2 and R3 in their totality, and region R5 comprises regions R2, R3 and R4 in their totality.

Region R1 comprises an unsegmented area of $\pi (r_1)^2$, which is free of division or sectionalization internal to itself. Radius $r_2$ of region R2 is greater than radius $r_1$ of region R1. Moreover, radius $r_1$ comprises a component of radii $r_2, r_3, r_4$ and $r_5$. For example, $r_2=r_1+(r_2-r_1)$ and $r_5=[r_1+(r_2-r_1)]+[r_2+(r_3-r_2)]+[r_3+(r_4-r_3)]+[r_4+(r_5-r_4)]$. Region R1 incompletely overlaps region R2, and thus also incompletely overlaps regions R3, R4 and R5 and comprises a component of regions R2, R3, R4 and R5. Thus, region 2 comprises region 1 in its totality, region R3 comprises regions R1 and R2 in their totality, region R4 comprises regions R1, R2 and R3 in their totality, and region R5 comprises regions R1, R2, R3 and R4 in their totality.

Frame 210 may comprise unsegmented regions that have other than a circular or substantially circular configuration. In an embodiment, the unsegmented regions may substantially conform to an elliptical ellipsoidal, ovoid or ovular configuration. In an embodiment, regions of frame 210 may conform to other than a substantially concentric arrangement. In an embodiment, frame 210 may comprise one or more regions that have one or more contours that conform to other than a curved surface. For example, one or more contours may conform to a substantially straight edge.

Figure 2C:
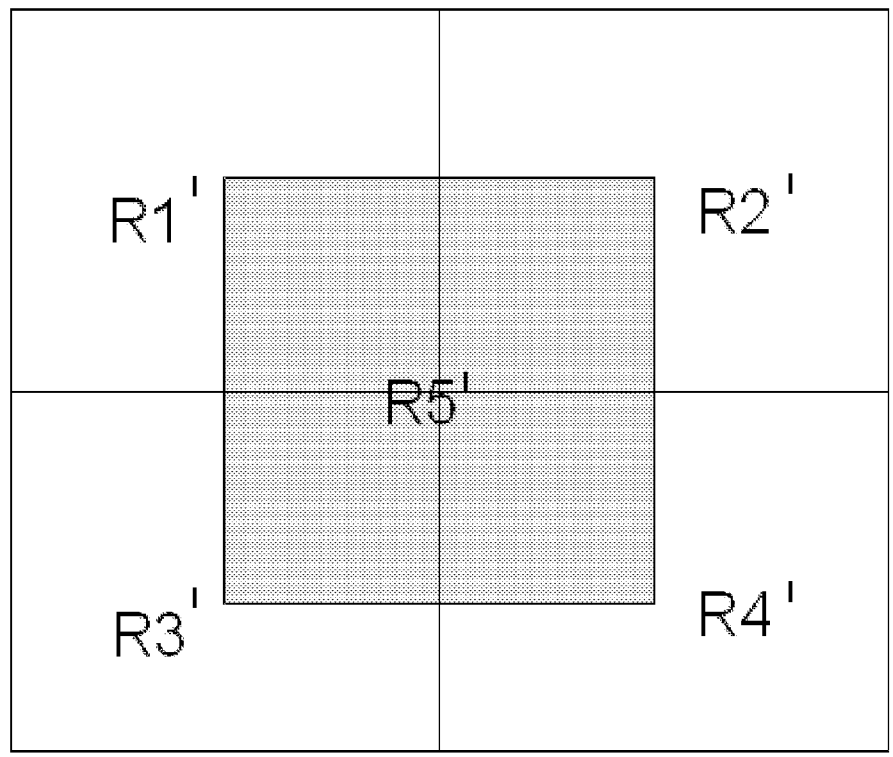
FIG. 2C depicts another example regionalized frame, according to an embodiment of the present invention.

FIG. 2C depicts an example of a frame 250, according to an embodiment of the present invention. Frame 250 comprises five (5) unsegmented regions R1', R2', R3', R4' and R5'. The contours of each of the regions of frame 250 are substantially straight. Region R1' is horizontally adjacent to region R2' and vertically adjacent to region R3'. Region R2' is horizontally adjacent to region R1' and vertically adjacent to region R4'. Region R3' is horizontally adjacent to region R4' and vertically adjacent to region R1'. Region R4' is horizontally adjacent to region R3' and vertically adjacent to region R2'.

The areas of each of the regions R1'-R4' may be substantially equal (but do not have to be). Region R5' overlaps a portion of each of the regions R1'-R4'. The portions of each of the regions R1'-R4' overlapped by region R5' may be substantially equal (but do not have to be). The area of region R5' may conform to the areas of the other regions. Alternatively or additionally (e.g., with according to various contexts or conditions), the area of region R5' may vary from the areas of the other regions.

In an embodiment, while regions R1', R2', R3', R4' and R5' each have an overlapping relationship with one or more of the other of the regions, the regions overlap independent of a hierarchical relationship, e.g., with which they may otherwise be arranged, arrayed, associated or related. For example, regions R1', R2', R3', R4' and R5' may each be implemented with a relationship with one or more of the other of the regions that is overlapping but not hierarchical.

While embodiments may function with unsegmented frame regions as depicted in FIG. 2B or FIG. 2C, the configurations depicted therein are presented by way of example. It should be appreciated that embodiments are not limited to the configurations depicted in FIG. 2B and FIG. 2C. On the contrary: embodiments of the present invention are well suited to function with unsegmented frame regions of virtually any configuration. Embodiments may, for example, function with unsegmented frame regions having contours that conform to other than curved surfaces, as shown in FIG. 2C.

Signatures derived from unsegmented frame regions that have curved contours, such as the substantially circular contour of the regions R1-R5 in FIG. 2B, may be substantially invariant under rotational and other geometric manipulation that may occur during processing. Thus, embodiments that function with unsegmented frame regions that have curved contours may compute media fingerprints that reliably correspond to the media with substantial robustness and resilience to geometric attacks.

With reference again to FIG. 2B, the radii for the regions may also be derived according to the criteria shown in Equations 3A-3B, below.

$$\pi r_1^2 = \pi(r_2^2 - r_1^2)$$

$$\pi r_1^2 = \pi(r_3^2 - r_2^2)$$

$$\pi r_1^2 = \pi(r_4^2 - r_3^2)$$

$$\pi r_1^2 = \pi(r_5^2 - r_4^2)$$ (Equations 3A, 3B, 3C, 3D.)

The criteria expressed in Equations 3A-3D allow, in proceeding outward from region R1 to R5, the area increments to remain equal to the area of the first region R1. For example, the area of region R5 is five (5) times the area of region R1. Similarly, the areas of regions R4, R3 and R2 are, respectively, four (4), three (3) and two (2) times the area of region R1. A simple relationship thus exists generally between the radius $r_n$ of an $n^{th}$ region ('n' being any positive whole number) and the radius of first region R1 ($r_1$) and can be expressed in Equation 4, below.

$$r_n = \sqrt{n} / r_1$$ (Equation 4.)

Any region $R_N$ includes all regions internal thereto, e.g., the inner regions $R_{N-1}, \ldots, R2, R1$. A region $R_N$ also has an area increment that is equal to the area of region R1. Media content corresponding to a video image or an audio spectrogram that exists within each of the regions remains essentially invariant over any amount of rotation or other geometric manipulation or change.

In step 110 (referring again to FIG. 1), moment invariants are computed from components of the unsegmented, incompletely overlapping spatial regions associated with the matrices $F_j^L$ and $D_j$. In an embodiment, 'M' features are extracted from each of the 'N' regions. A feature matrix is derived from the regions of matrix $F_j^L$, which is denoted as $F_j^M$. Feature matrix $F_j^L$ has a dimension H×W and $F_j^M$ has a dimension N×M. With respect to these dimensions, the terms 'H' and 'W' respectively represent or correspond to the height and width of the downsampled video frame, and the terms 'N' and 'M' respectively represent the number of regions and the number of features extracted from each region. Similarly, the 'M' features are also extracted from 'N' regions of the matrix $D_j$ to create feature matrix $D_j^M$. The robustness of the media fingerprints derived from the matrices is based, at least in part, on the robustness of the M features extracted from each of the N regions. For example, the robustness of the fingerprints computed from the matrices may, at least partially, depend on the resilience of the extracted features to rotational manipulation, which may comprise a feature of a geometric attack on the media content.

In an embodiment, a set of seven (or another number of) moment invariants is computed from the N (e.g., 5) regions as features. This set of moment invariants comprises an essentially global measure of the image surface that is robust against translation, rotation and scale change attacks. In an embodiment, the moment invariants are computed from each of the N regions. A set of non-central moments ($m_{pq}$) may be computed according to Equation 5, below.

$$m_{pq} = \sum_x \sum_y x^p y^q F_j^L(x, y)$$ (Equation 5.)

For example, the set of non-central moments $m_{pq}$ that are computed may include moments $m_{00}$, $m_{01}$, $m_{10}$, $m_{11}$, $m_{02}$, $m_{20}$, $m_{12}$, $m_{21}$, $m_{03}$ and $m_{30}$. Moments $m_{00}$-$m_{30}$, comprise a set of non-central moments that have an order of p+q, for example, less than or equal to three (3). The computation represented by Equation 5 above is performed for all x,y locations within a region $R_N$ of the image $F_j^L$. The term $F_j^L(x,y)$ represents an intensity value associated with a pixel located at (x,y) within region $R_N$.

A set of central moments $\mu_{pq}$ may be computed from the non-central moments $m_{pq}$ according to Equation 6, below.

$$\mu_{pq} = \sum_x \sum_y (x - \bar{x})^p (y - \bar{y})^q F_j^L(x, y)$$ (Equation 6.)

$$\bar{x} = \frac{m_{10}}{m_{00}}$$

$$\bar{y} = \frac{m_{01}}{m_{00}}$$

$$\mu_{00} = m_{00}$$

$$\mu_{10} = \mu_{01} = 0$$

$$\mu_{20} = m_{20} - \bar{x} m_{10}$$

$$\mu_{02} = m_{02} - \bar{y} m_{01}$$

$$\mu_{11} = m_{11} - \bar{y} m_{10}$$

$$\mu_{30} = m_{03} - 3\bar{x} m_{02} + 2 m_{01} \bar{x}^2$$

$$\mu_{03} = m_{03} - 3\bar{y} m_{02} + 2 m_{01} \bar{y}^2$$

$$\mu_{12} = m_{12} - 2\bar{y} m_{11} - \bar{x} m_{02} + 2 m_{10} \bar{y}^2$$

$$\mu_{21} = m_{21} - 2\bar{x} m_{11} - \bar{y} m_{20} + 2 m_{01} \bar{x}^2$$

The centralized moments $\mu_{pq}$ may be normalized according to Equation 7, below.

$$\eta_{pq} = \frac{\mu_{pq}}{\mu_{00}^\gamma}$$ (Equation 7.)

$$\gamma = \frac{p + q}{2} + 1; \; p + q = 2, 3 \ldots$$

Moment invariants may be computed from combined normalized central moments $\eta_{pq}$. For example, seven moment invariants $\Phi_1, \Phi_2, \ldots, \Phi_7$ may be computed from a combination of the normalized central moments $\eta_{pq}$ according to Equation 8, below. [Description continues at p. 22.]

$$\Phi_1 = \eta_{20} + \eta_{02}$$

$$\Phi_2 = (\eta_{20} - \eta_{02})^2 + 4\eta_{11}^2$$

$$\Phi_3 = (\eta_{30} - 3\eta_{12})^2 + (3\eta_{21} - \eta_{03})^2$$

$$\Phi_4 = (\eta_{30} + \eta_{12})^2 + (\eta_{21} + \eta_{03})^2$$

$$\Phi_5 = (\eta_{30} - 3\eta_{12})(\eta_{30} + \eta_{12})[(\eta_{30} + \eta_{12})^2 - 3(\eta_{21} + \eta_{03})^2] + (3\eta_{21} - \eta_{03})(\eta_{21} + \eta_{03})[3(\eta_{30} + \eta_{12})^2 - (\eta_{21} + \eta_{03})^2]$$

$$\Phi_6 = (\eta_{02} - \eta_{02})[(\eta_{30} + \eta_{12})^2 - (\eta_{21} + \eta_{03})^2] + 4\eta_{11}(\eta_{21} + \eta_{03})(\eta_{12} + \eta_{30})$$

$$\Phi_7 = (3\eta_{21}-\eta_{03})(\eta_{30}+\eta_{12})[(\eta_{30}+\eta_{12})^2 - 3(\eta_{21}+\eta_{03})^2] + \\ (3\eta_{12}-\eta_{30})(\eta_{21}+\eta_{03})[3(\eta_{30}+\eta_{12})^2 - (\eta_{21}+\eta_{03})^2]$$ (Equation 8.)

Moment invariants $\Phi_1, \Phi_2, \ldots \Phi_7$ may be computed for each region from the rows of matrix $F_j^M$. In an example implementation, H=120, W=160, N=5 and M=7: a 120*160 frame with five (5) unsegmented and incompletely overlapping concentric regions and seven (7) moment invariants.

Step 110 similarly includes the computations according to Equations 5, 6, 7 and 8 on the input image $D_j$ to create matrix $D_j^M$.

The non-central moments $m_{pq}$ of a region $R_N$, e.g., computed according to Equation 6 above, may be computed in an incremental fashion. For example, the non-central moments of an unsegmented region $R_{N-1}$, internal to and incompletely overlapping region $R_N$, may be available, having been previously computed. Region $R_N$ includes $R_{N-1}$ in its totality, e.g., as described above with reference to FIG. 2B. Thus, the function of Equation 6 above for computing moments $m_{pq}$ of region $R_N$ may be achieved with computations executed according to Equation 9, below.

$$m_{pq} = \sum_x \sum_y x^p y^q F_j^L(x, y) + \sum_k \sum_l k^p l^q F_j^L(k, l)$$ (Equation 9.)

$x, y \in R_{N-1}$ $k, l \in R_N$

The first term in Equation 9 above represents the non-central moment of region $R_{N-1}$. Thus, upon computing the non-central moments of the inner-most unsegmented region $R_1$, the moments of subsequent regions, external with respect to region $R_1$, may be computed in an incremental fashion through computations performed for the outer region $R_N$, according to Equation 9, above. In an embodiment, incremental computation of the features is performed for overlapping regions, which allows computations performed for a particular region to be leveraged for computing statistics for regions of which it may be a component, e.g., as described herein with reference to FIG. 2B.

Thus, moment invariants may be computed as M features from each of the N regions. Alternatively or additionally, an embodiment computes features from each region with chroma (or chrominance) related and luma (or luminance) related values, e.g., using a color/intensity histogram that comprises 'M' bins within each of the N regions. The N×M color/intensity histogram is also invariant under geometric operations such as rotation. Thus, media fingerprints computed therewith are also robust against geometric attack. An embodiment functions to compute M features from each region, which are invariant to the processing operations under which fingerprint robustness is desired.

In step 112, a transformation is computed over matrices $F_j^M$ and $D_j^M$. The input matrices $F_j^M$ and $D_j^M$ each represent how the features, which are extracted from each region, may change as sampling or computation proceeds from the innermost region R1 to the outermost region $R_N$. In an embodiment, the columns of matrices $F_j^M$ and $D_j^M$ are transformed with their projection over or onto a set of basis vectors to respectively create transformed matrices $F_j^T$ and $D_j^T$. The set of basis vectors captures, essentially directly, how features of an image may vary as sampling or computation proceeds from the innermost region R1 to the outermost region $R_N$.

In an embodiment, the basis vectors are computed with a collection of a training set, which comprises a number 'J' of matrices, $F_1^M, F_2^M, \ldots, F_J^M$. A matrix V is computed that has dimensions of N*J. The columns of matrix V are derived from a particular, e.g., first, column of each matrix in training set $F_1^M, F_2^M, \ldots F_J^M$. The mean of each column in matrix V is computed. The mean of each column computed over matrix V is subtracted from the elements of the corresponding column. Basis vectors $B_1, B_2, \ldots B_N$ of the column space of matrix V are computed. In an embodiment, matrix V is factorized using singular value decomposition (SVD) or non-negative matrix factorization.

Figure 3:
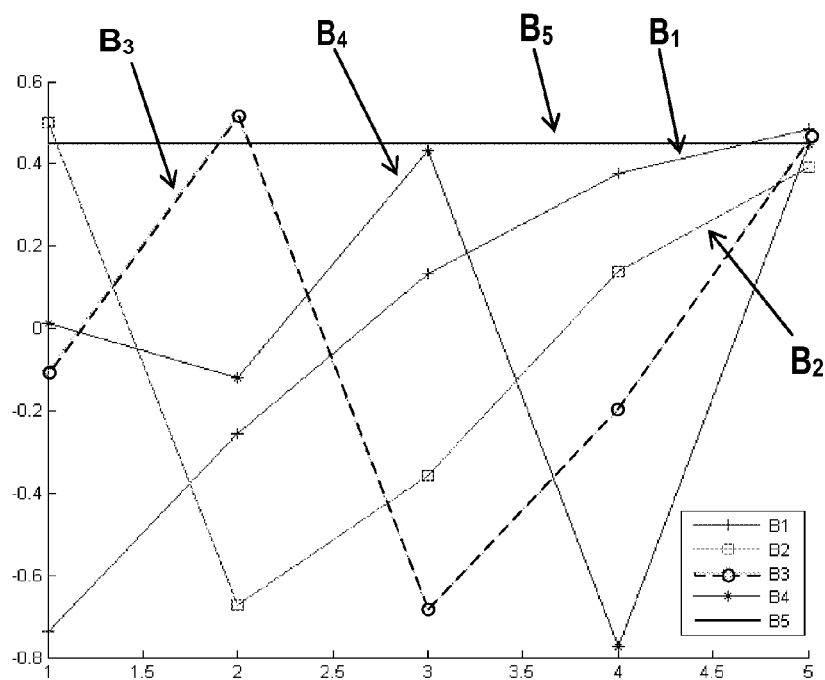
FIG. 3 depicts an example matrix vector space basis, according to an embodiment of the present invention.

FIG. 3 depicts an example matrix vector space basis 300, according to an embodiment of the present invention. Basis 400 comprises a basis of the column space of matrix V over dimensions 5*6000, wherein N=5 and J=6000. With reference to FIG. 2B, basis 400 thus captures variation of a feature from region R1 through region R5 over 6,000 examples in the training set.

The basis vectors may capture different patterns. For example, basis vector B1 captures an essentially monotonically increasing pattern of the feature. Thus, for a feature in the feature matrix $F_j^M$ that has such a monotonically increasing pattern, values projected onto the basis vector B1 would likely exceed values of projections of other features thereon. Thus transforming the columns of matrices $F_j^M$ and $D_j^M$ with basis 400, patterns of feature variation may be captured directly from region $R_1$ through $R_N$. An embodiment captures how features may vary across the different regions (which are not limited to concentric circular configurations, e.g., as described with reference to FIG. 2C). Moreover, capturing how features may vary across the different regions is independent of what features are being extracted in each of the regions. An embodiment uses matrix vector space bases that each comprise column values that correspond to each of multiple video frames, which effectively captures feature variations that may occur over time.

In steps 113 and 114, signature bits are created from the matrices $F_j^T$ and $D_j^T$, respectively. Generating signature bits may involve identical, essentially identical, or similar transformation computations, executed over the values in both matrices $F_j^T$ and $D_j^T$. For purposes related to clarity, simplicity and brevity, bit extraction is thus described with reference to matrix $F_j^T$. However, it should be appreciated by ordinarily skilled artisans in fields or technologies relating to the example embodiments described herein that this description applies equally in relation to computing signature bits over values associated with matrix $D_j^T$.

Embodiments may generate signature bits with creation of K pseudo-random vectors $P_1, P_2, \ldots P_K$, which may have the same dimensions as matrix $F_j^T$. Matrix $F_j^T$ may be projected onto the set of $K_1$ vectors, which have the same dimensions as matrix $F_j^T$, according to Equation 10, below.

$$H_k = \sum_{i=1}^{M_1} \sum_{j=1}^{M_2} (Q \cdot (i, j) * P_k(i, j)).$$ (Equation 10)

Matrix Q comprises one or more of matrix $F_j^T$ or matrix $D_j^T$. The term $M_1$ represents a number 'M', which corresponds to a population of features per region. The term $M_2$ represents the number 'N', which as used herein may represent the number of internally unsegmented regions. The signature bits may be derived by thresholding the $K_1$ projections.

Figure 4:
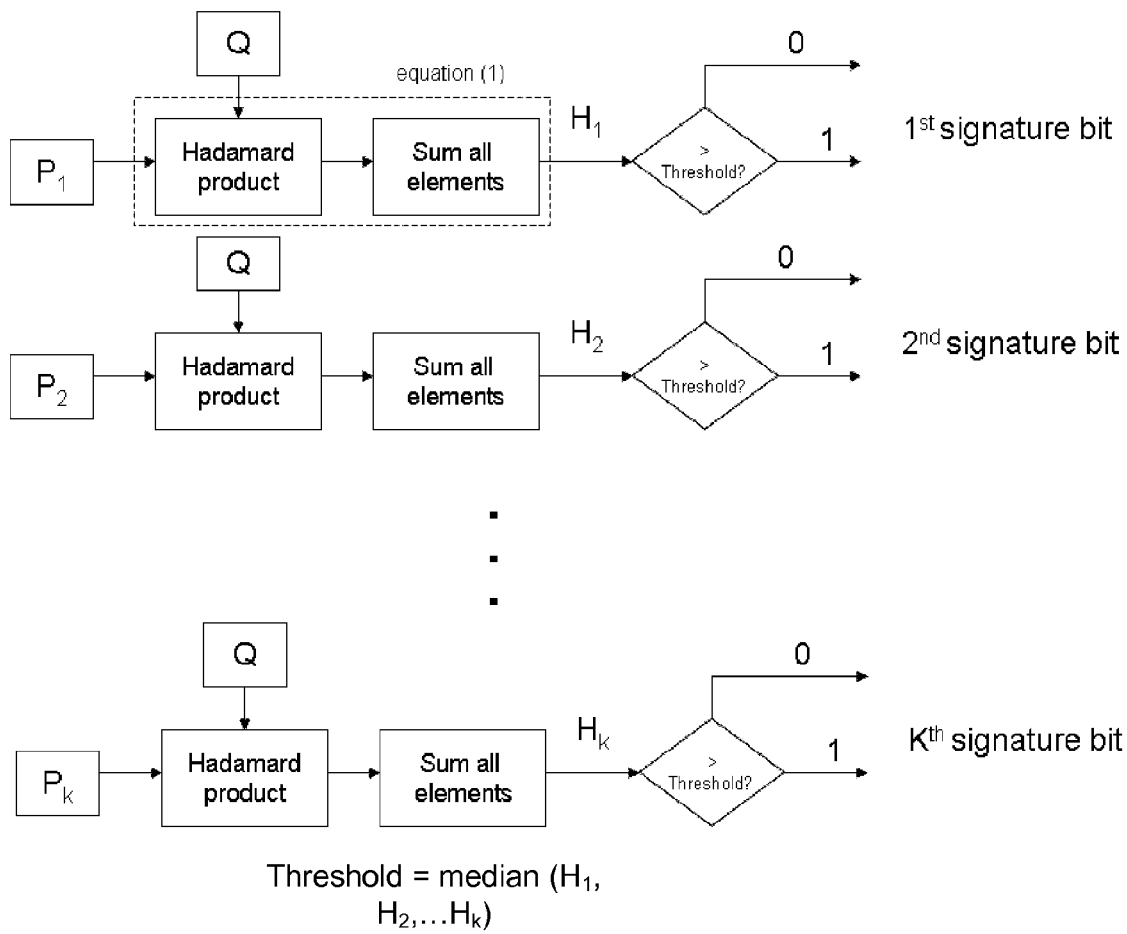
FIG. 4 depicts another example procedure, according to an embodiment of the present invention.

In steps 115 and 116, hash bits are created from the transformed matrices $F_j^T$ and $D_j^T$, respectively. FIG. 4 depicts a procedure 400 for creating hash bits based on projections onto pseudo-random vectors, with which an embodiment of the present invention may function. The projections based on the set of $K_1$ vectors $P_1, P_2, \ldots P_{K1}$ may capture different aspects of the matrix $F_j^T$. For example, if any two of the $K_1$ vectors are similar, then two bits out of the $K_1$ bits may be identical (or substantially so). Thus, an orthogonal basis set of $K_1$ vectors may be used. Alternatively, or additionally under some conditions or circumstances, or in certain contexts or uses, a set of $K_1$ pseudo-random vectors may be used. For instance, it is assumed that the $K_1$ pseudo-random vectors $P_1$, $P_2, \ldots P_{K1}$ are approximately orthogonal to each other. $K_1$ hash bits may be created from $F_j^T$ based on projections of matrix Q onto $K_1$ pseudo-random vectors $P_1, P_2, \ldots P_{K1}$. Similarly, $K_2$ hash bits are created from $D_j^T$ bits. This projection step reduces the dimensionality of matrix $F_j^T$ or matrix $D_j^T$ and generates bits from this matrix. Note that the pseudo-random matrices are not low pass filtered to make them smooth and this helps towards each $P_i$ capturing independent information from the input matrix Q. The pseudo-random matrices can also be optimized using a training data-set to help pick the set of pseudo-random matrices that capture independent information.

Signature bits may be derived by thresholding the $K_1$ projections. In an embodiment, hash bits are created based on projections onto pseudo-random vectors. The projections based on the set of K1 vectors P1, P2, ... PK1 may capture different aspects of the matrix D. For example, if any two of the K1 vectors are similar, then two bits out of the K1 bits will be identical. Thus, an orthogonal basis set of K1 vectors may be used. Alternatively, a set of K1 pseudo-random vectors may be used, as it is assumed that the K1 pseudo-random vectors are approximately orthogonal to each other.

$K_1$ hash bits may be created from Q based on Hadamard product projections $H_1, H_2, \ldots, H_{K1}$ onto $K_1$ pseudo-random vectors. For the number i running from 1 through $K_1$, the $i^{th}$ signature bit may be set to a value of '1' if $H_i$ is greater than the median of $H_1, H_2, \ldots, H_{K1}$. Where the $H_i$ is not greater than the median of $H_1, H_2, \ldots, H_{K1}$ however, the corresponding signature bit may be set to a value of '0'. In a substantially similar manner, $K_2$ hash bits are created from $V_r$ bits.

In re-generating a video fingerprint from modified video content, e.g., for comparison or reference to fingerprints of corresponding original video content, values for the parameters such as $T_{chunk}$, the number of spatial regions, the number of features extracted per region, and/or the pseudo-random matrices, may be essentially unchanged.

In step 114, a media fingerprint is created. The media fingerprint has a length of $K_1 + K_2$ bits and comprises a concatenation of the two sets of hash bits from $F_j^T$ and $D_j^T$. The pseudo-random matrices for generating $K_1$ hash bits and the pseudo-random matrices for generating $K_2$ hash bits may differ. (In an example implementation, $K_1$ and $K_2$ are set to values of 18.)

Example Implementation Platforms

Embodiments of the present invention, such as a part of procedures 100 and 400 (FIG. 1, 4, respectively) may be implemented with a computer system, systems configured in electronic circuitry and components, an integrated circuit (IC) device such as a programmable logic device (PLD), e.g., a microcontroller, a field programmable gate array (FPGA), or an application specific IC (ASIC). Alternatively or additionally, embodiments of the present invention may be implemented with apparatus that includes one or more of such systems, devices or components. Example platforms with which an embodiment of the present invention may be implemented are described in one or more of the Appendices hereto, submitted herewith, which are incorporated by reference herein.

Figure 5:
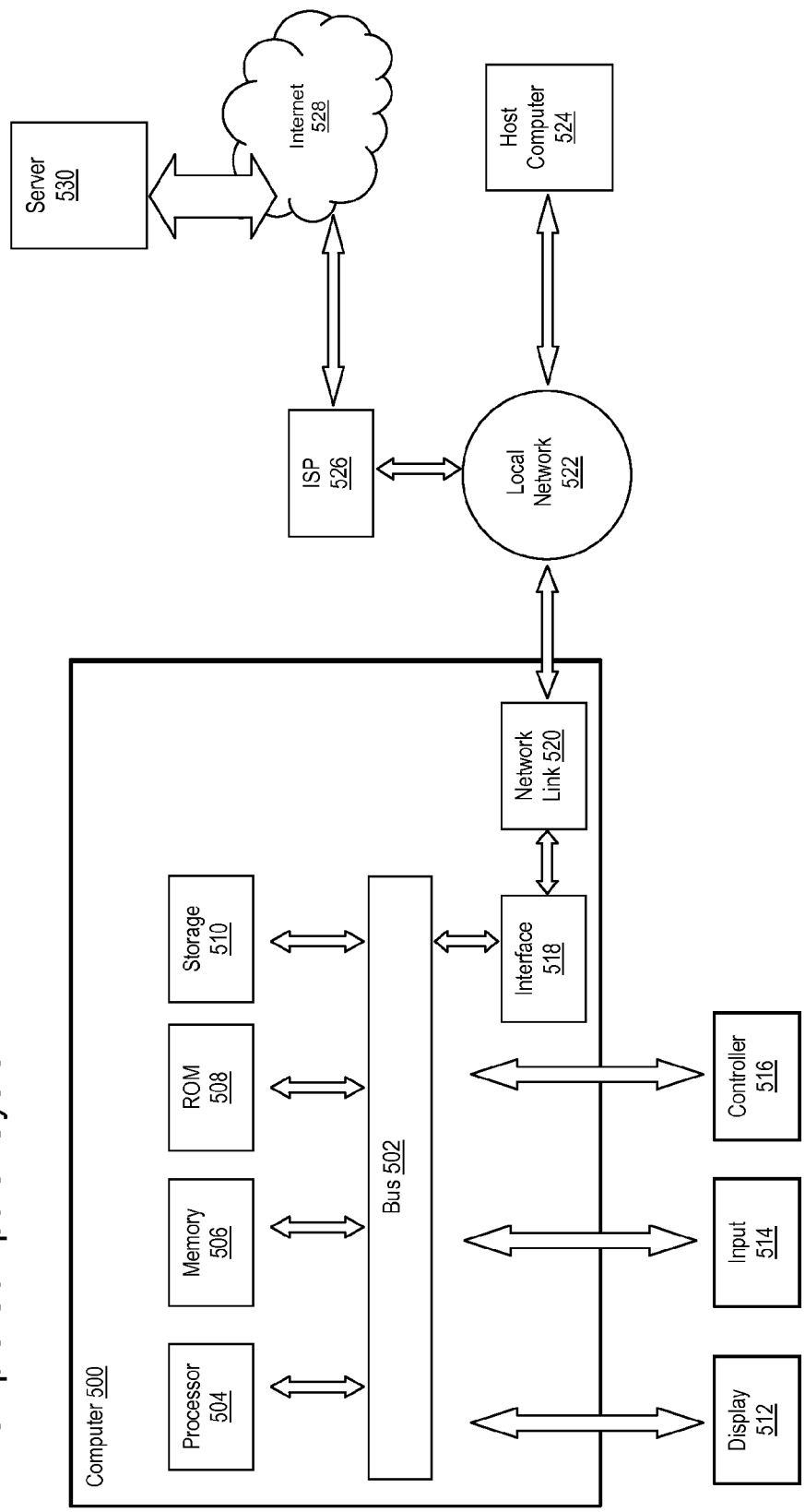
FIG. 5 depicts an example computer system platform, with which an embodiment of the present invention may be implemented.

FIG. 5 depicts an example computer system platform 500, with which an embodiment of the present invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), cathode ray tube (CRT), plasma display or the like, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Embodiments of the invention may relate to the use of computer system 500 for deriving media fingerprints that reliably correspond to media content, e.g., with projection of moment invariants. According to an embodiment of the invention, rewriting queries with remote objects is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The terms "computer-readable medium" or "computer-readable storage medium," as used herein, may relate to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and other conductors and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a digital subscriber line (DSL), cable or other modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for deriving media fingerprints that reliably correspond to media content, e.g., with projection of moment invariants, as described herein. The received code may be executed by processor 504 as it is received, and/or stored in storage device 510, or other non-volatile storage for later execution. In this manner, computer system 500 may obtain application code in the form of a carrier wave.

Equivalents, Extensions, Alternatives and Miscellaneous

Thus, example embodiments relating to media fingerprints that reliably correspond to media content, e.g., with projection of moment invariants, are described. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

An embodiment of the present invention may relate to one or more of the example embodiments enumerated below.

1. A method, comprising the steps of:
    accessing a portion of media content;
    sampling one or more components from a first spatial region of the media content;
    wherein the first spatial region comprises an unsegmented area;
    sampling one or more components from a second spatial region of the media content;
    wherein the second spatial region comprises an unsegmented area;
    wherein the first spatial region comprises an element of the second spatial region; and
    deriving a media fingerprint from the components of the first and the second spatial regions;
    wherein the media fingerprint reliably corresponds to the media content portion.

2. The method as recited in enumerated example embodiment 1, further comprising the steps of:
    sampling one or more components from an Nth spatial region of the media content;
    wherein the Nth spatial region comprises an unsegmented area; and
    wherein the second spatial region comprises an element of the Nth spatial region; and
    deriving the media fingerprint from the components of the first, second, and Nth spatial regions.

3. The method as recited in one or more of enumerated example embodiment 2 or enumerated example embodiment wherein N comprises an integer that has a value greater than two (2).

4. The method as recited in enumerated example embodiment 3, further comprising the steps of:
    sampling one or more components from a media content spatial region that has an ordinal identity corresponding to an integer with a value (N−1);
    wherein the spatial region that corresponds to the integer (N−1) comprises an unsegmented area; and
    wherein the spatial region that corresponds to the integer (N−1) comprises an element of the Nth spatial region; and
    deriving the media fingerprint from the components of the first, second, and Nth spatial regions and the spatial region that corresponds to the integer (N−1).

5. The method as recited in enumerated example embodiment 1 wherein the first spatial region and the second spatial region each conform to a similar configuration.

6. The method as recited in enumerated example embodiment 5 wherein the similar configuration comprises a similar geometric shape.

7. The method as recited in enumerated example embodiment 6 wherein the first spatial region incompletely overlaps the second spatial region.
8. The method as recited in one or more of enumerated example embodiments 6 or 7 wherein the first spatial region is substantially centered with respect to the second spatial region.
9. The method as recited in enumerated example embodiment 3 wherein the configuration comprises at least one of an ellipsoid or an ovoid.
10. The method as recited in enumerated example embodiment 9 wherein the ellipsoid conforms to a circular or elliptical configuration; and
   wherein a center of:
   the circularly configured first spatial region; or
   one or more of a major axis or a minor axis of the elliptically configured first spatial region,
is substantially aligned with a center of the media content portion.
11. The method as recited in one or more of enumerated example embodiments 1-10 wherein one or more of the second through the Nth spatial regions comprises a spatial projection of the first spatial region, which is substantially spatially congruent with respect thereto, wherein the first and the second through the Nth spatial regions are oriented substantially concentrically with respect to each other.
12. The method as recited in one or more of enumerated example embodiments 1-11 wherein the wherein the first spatial region comprises a spatial element of the second spatial region; and
   wherein one or more of the second spatial region or the spatial region that corresponds to the integer (N−1) comprises an spatial element of the Nth spatial region.
13. The method as recited in one or more of enumerated example embodiments 1-12 wherein the deriving step comprises the step of:
   computing a set of statistics that relate to each of the sampled spatial region components.
14. The method as recited in enumerated example embodiment 13 wherein the set of statistics comprise a plurality of moment invariants associated with the sampled spatial region components.
15. The method as recited in one or more of enumerated example embodiments 1-14 wherein the media comprises one or more of:
   a video medium wherein the media fingerprints comprise video fingerprints, which are descriptive in relation to a variation in a feature of an image in the video medium over each of the spatial regions;
   an audio medium wherein the media fingerprints comprise audio/acoustic fingerprints, which are descriptive in relation to a variation in a characteristic of a spectrogram associated with the media content portion over each of the spatial regions.
16. The method as recited in enumerated example embodiment 15, further comprising the steps of:
   generating a difference instance from one or more of the video image or the audio spectrogram;
   computing the plurality of moment invariants from a set of regions in the difference instance; and
   describing a variation in a motion associated with one or more of the video image or a characteristic of the audio spectrogram over each of the spatial regions.
17. The method as recited in enumerated example embodiment 13 wherein the computing the set of statistics step comprises the step of:
   computing a set of statistics that relate to the components sampled from the first spatial region; and
   incrementally computing a set of statistics that relate to the components of each subsequent region through the Nth region.
18. The method as recited in enumerated example embodiment 17 wherein the incrementally computing step comprises the steps of:
   computing a set of statistics for each of the spatial regions in an order from a spatial region of a smaller area to each of the spatial regions of increasing area subsequent thereto;
   storing each of the sets of statistics as they are computed for each of the spatial regions;
   upon the sampling of the components of each of the subsequent spatial regions, accessing the stored sets of statistics for each of the spatial regions of smaller areas; and
   using the accessed sets of statistics in the computing the set of statistics step for each of the spatial regions of increasing area subsequent thereto.
19. The method as recited in enumerated example embodiment 13 wherein the components comprise at least one of an intensity element or a color element of the video image or an intensity element or a frequency element of the audio media content portion;
   wherein the computing the set of statistics step comprises the steps of:
   generating a histogram representative of the intensity elements, the frequency element or the color element;
   measuring the intensity, frequency or color representative histogram over each of the spatial regions; and
   describing a change in a bin population associated with the histogram over each of the spatial regions.
20. The method as recited in enumerated example embodiment 13 wherein the computing the statistics step further comprises the steps of:
   from an offline training set of frames of the media content, collecting a set of matrices from among the sampled spatial region components of the training set frames of media content wherein the training set has a population of 'J';
   computing a matrix 'V' from the J matrices wherein the matrix V comprises:
   a first dimension 'N' that relates to the number of spatial regions; and
   a second dimension that relates to the population 'J' of the training set;
   wherein a plurality of values in one or more columns of the matrix V are derived from one of the columns of each matrix of the training set;
   computing a mean of each of the one or more matrix V columns;
   computing a difference between the mean and each of the values of each of the columns; and
   estimating a set of basis vectors in a first dimensional space from the computed differences.
21. The method as recited in enumerated example embodiment 20 wherein the estimating step comprises the step of:
   factorizing the matrix V.
22. The method as recited in enumerated example embodiment 21 wherein the factorizing step comprises at least one of the steps of:
   computing a singular value decomposition over the matrix V; or
   computing a non-negative factorization over the matrix V.
23. The method as recited in enumerated example embodiment 21, further comprising the steps of:

projecting a plurality of values that correspond to one or more of a feature or characteristic of two or more of the spatial regions onto one or more of the estimated basis vectors; and
transforming the set of matrices based on the projecting set; and
determining a variability of the one or more of the feature or the characteristic over the spatial regions.

24. The method as recited in enumerated example embodiment 13 wherein the computing the statistics step further comprises the steps of:
from an offline training set of frames of the media content, collecting a set of matrices from among the sampled spatial region components of the training set of frames of media content wherein the training set has a population of 'J';
computing a matrix 'V' from the J matrices wherein the matrix V comprises:
a first dimension 'N' that relates to the number of time steps; and
a second dimension that relates to a population 'J' of the training set;
wherein a plurality of values in one or more columns of the matrix V are derived from one of the columns of each matrix of the training set;
computing a mean of each of the one or more matrix V columns;
computing a difference between the mean and each of the values of each of the columns;
estimating a set of basis vectors in a first dimensional space from the computed differences; and
determining a variability of the feature or characteristic over time, in relation to the frames and a frame rate associated therewith.

25. The method as recited in one or more of enumerated example embodiment 20 or enumerated example embodiment 24 wherein the deriving a fingerprint step further comprises the steps of:
computing a plurality of pseudo-random vectors that each have the dimensions N and M;
projecting each of the matrices onto each of the pseudo-random vectors wherein a plurality of scalar values is derived, each of the scalar values corresponding to one of the projected matrices;
computing a threshold that corresponds to a median of the plurality of scalar values; and
comparing the scalar values to the threshold wherein the fingerprint is derived based on the comparison.

26. The method as recited in one or more of enumerated example embodiments 1-12 wherein the deriving step comprises the step of:
computing a set of statistics that relate to each of the sampled spatial region components; and
wherein the set of statistics comprise a plurality of moment invariants that are sampled over an arbitrary set of regions of the media content portion.

27. A method, comprising the steps of:
computing a set of statistics that relate to at least one of:
each of a plurality of spatial region components that are sampled from one or more frames of media content wherein the media content comprises one or more of video, audio or mixed media content; or
a plurality of moment invariants that are sampled over an arbitrary set of regions of the media content portion; and
deriving a media fingerprint from the spatial region components wherein the media fingerprint reliably corresponds to the media content portion.

28. The method as recited in enumerated example embodiment 27 wherein the computing the statistics step comprises the steps of:
from an offline training set of frames of the media content, collecting a set of matrices from among the sampled spatial region components of the training set frames of media content wherein the training set has a population of 'J';
computing a matrix 'V' from the J matrices wherein the matrix V comprises:
a first dimension 'N' that relates to the number of spatial regions; and
a second dimension that relates to the population 'J' of the training set;
wherein a plurality of values in one or more columns of the matrix V are derived from one of the columns of each matrix of the training set;
computing a mean of each of the one or more matrix V columns;
computing a difference between the mean and each of the values of each of the columns; and
estimating a set of basis vectors in a first dimensional space from the computed differences wherein a spatial variation in a feature of the media content portion is determinable therewith.

29. The method as recited in enumerated example embodiment 28 wherein the estimating step comprises the step of:
factorizing the matrix V.

30. The method as recited in enumerated example embodiment 28 wherein the factorizing step comprises at least one of the steps of:
computing a singular value decomposition over the matrix V; or
computing a non-negative factorization over the matrix V.

31. The method as recited in enumerated example embodiment 28, further comprising the steps of:
projecting a plurality of values that correspond to one or more of a feature or characteristic of two or more of the spatial regions onto one or more of the estimated basis vectors; and
transforming the set of matrices based on the projecting set; and
determining a variability of the one or more of the feature or the characteristic over the spatial regions.

32. A method, comprising the steps of:
computing a set of statistics that relate to at least one of:
each of a plurality of sampled spatial region components that are sampled from one or more frames of media content wherein the media content comprises one or more of video, audio or mixed media content; or
a plurality of moment invariants that are sampled over an arbitrary set of regions of the media content portion; and
deriving a media fingerprint from the components of the first and the second spatial regions wherein the media fingerprint reliably corresponds to the media content portion.

33. The method as recited in enumerated example embodiment 32 wherein the computing the statistics step comprises the steps of:
from an offline training set of frames of the media content, collecting a set of matrices from among the sampled spatial region components of the training set of frames of media content wherein the training set has a population of 'J';
computing a matrix 'V' from the J matrices wherein the matrix V comprises:
a first dimension 'N' that relates to the number of time steps; and
a second dimension that relates to a population 'J' of the training set;

wherein a plurality of values in one or more columns of the matrix V are derived from one of the columns of each matrix of the training set;

computing a mean of each of the one or more matrix V columns;

computing a difference between the mean and each of the values of each of the columns;

estimating a set of basis vectors in a first dimensional space from the computed differences; and determining a variability of the feature or characteristic over time, in relation to the frames and a frame rate associated therewith.

34. The method as recited in enumerated example embodiment 33 wherein the deriving a fingerprint step further comprises the steps of:

computing a plurality of pseudo-random vectors that each have the dimensions N and M;

projecting each of the matrices onto each of the pseudo-random vectors wherein a plurality of scalar values is derived, each of the scalar values corresponding to one of the projected matrices;

computing a threshold that corresponds to a median of the plurality of scalar values; and comparing the scalar values to the threshold wherein the fingerprint is derived based on the comparison.

35. The method as recited in enumerated example embodiment 1 wherein the first spatial region spatially overlaps with the second spatial region independent of a hierarchical relationship between the first region and the second region.

36. The method as recited in enumerated example embodiment 1, further comprising the steps of:

sampling one or more components from an Nth spatial region of the media content;

wherein the Nth spatial region comprises an unsegmented area;

wherein one or more of the first spatial region, the second spatial region and the Nth spatial region comprises an element of one or more of the other of the spatial regions; and deriving the media fingerprint from the components of the first, second, and Nth spatial regions.

37. A method, comprising the steps of:

accessing a portion of media content wherein the media content comprises one or more of audio, video, mixed or multimedia content;

sampling one or more components from a first spatial region of the media content;

wherein the first spatial region comprises an unsegmented area;

sampling one or more components from a second spatial region of the media content;

wherein the second spatial region comprises an unsegmented area;

wherein the first spatial region spatially overlaps in part with the second spatial region independent of a hierarchical relationship between the first region and the second region; and deriving a media fingerprint from the components of the first and the second spatial regions wherein the media fingerprint reliably corresponds to the media content portion.

38. A method, comprising the steps of:

a) for a first representation of a portion of media content of a temporally related group of content portions in a sequence of media content, accessing values for content elements over a matrix of spatial regions into which the first representation is partitioned;

b) estimating a set of basis vectors in a first dimensional space from an offline training set of the content portions wherein the set of basis vectors comprise statistics that relate to each of a plurality of sampled spatial region components that are sampled from one or more frames of media content wherein the media content comprises one or more of video, audio or mixed media content; and c) transforming the first representation into a second representation of the media content portion in a second dimensional space wherein the second representation comprises a projection of the first representation based on the estimated basis vectors;

wherein a media fingerprint is derived, based at least in part, on the second representation.

39. The method as recited in enumerated example embodiment 38 wherein the estimating step comprises the steps of:

from an offline training set of frames of media content, collecting a set of matrices from among a plurality of sampled spatial region components of the training set frames of media content wherein the training set has a population of 'J';

computing a matrix 'V' from the J matrices wherein the matrix V comprises:

a first dimension 'N' that relates to at least one of the number of spatial regions or a number of time steps; and a second dimension that relates to the population 'J' of the training set;

wherein a plurality of values in one or more columns of the matrix V are derived from one of the columns of each matrix of the training set;

computing a mean of each of the one or more matrix V columns; and computing a difference between the mean and each of the values of each of the columns;

wherein the set of basis vectors ate estimated in the first dimensional space from the computed differences wherein one or more of a spatial variation or a temporal variation in a feature of the media content portion are determinable therewith.

40. A system, comprising:

means for performing steps of a method as recited in one or more of enumerated example embodiments 1-39.

41. An apparatus or system, comprising:

at least one processor; and a computer readable medium comprising instructions, which when executed by the processor cause the system to perform steps of a method as recited in one or more of enumerated example embodiments 1-39.

42. An integrated circuit (IC) device that is configured or programmed to perform steps of one or more of the methods that are recited in enumerated example embodiments 1-39, or embody, dispose, or support one or more of the systems as recited in enumerated example embodiments 40-41.

43. The IC device as recited in enumerated example embodiment 42 wherein the IC comprises at least one of a processor, a programmable logic device (PLD), a microcontroller, a field programmable gate array (FPGA), a digital signal processor (DSP), or an application specific IC (ASIC).

44. A use for a computer system, comprising:

performing, controlling or executing a method as recited in one or more of enumerated example embodiments 1-29.

45. A computer readable storage medium comprising encoded instructions which, when executed by one or more processors, cause the one or more processors to:

perform the steps of the method as recited in one or more enumerated example embodiments 1-29;

configure or program at least one of one or more of the apparatus or systems that are recited in one or more of enumerated example embodiments 30-31;

configure or program one or more of the IC devices that are recited in one or more of enumerated example embodiments 32-33; or program or control a computer system use as recited in enumerated example embodiments 34.

Equivalents, Extensions, Alternatives and Miscellaneous

Thus, example embodiments relating to media fingerprints that reliably correspond to media content, e.g., with projection of moment invariants, are described. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising the steps of:
accessing a portion of media content;
wherein the media content comprises one or more of a video image or an audio spectrogram;
sampling one or more components from a first spatial region of the media content;
sampling one or more components from a second spatial region of the media content;
wherein the first spatial region overlaps with the second spatial region;
deriving a first media fingerprint from the components of the first and the second spatial regions based on one or more of moment invariants, chrominance related values, or luminance related values;
generating a difference instance from the media content by comparing a current image derived from the media content and a temporally averaged image derived from the media content;
computing a plurality of moment invariants from a set of regions in the difference instance;
deriving a second media fingerprint based on the plurality of computed moment invariants; and
concatenating the first media fingerprint and the second media fingerprint;
wherein the step of deriving a first fingerprint further comprises the steps of:
computing a plurality of pseudo-random vectors that each have dimensions N and M;
projecting each of a set of projected matrices onto each of the pseudo-random vectors wherein a plurality of scalar values is derived, each of the scalar values corresponding to one of the projected matrices;
computing a threshold that corresponds to a median of the plurality of scalar values; and
making a comparison of the scalar values and the threshold wherein the first fingerprint is derived based on the comparison;
wherein each of the steps of the method is performed by one or more computing devices.

2. The method as recited in claim 1, wherein the first media fingerprint relates to a feature in the first region and the second region, and wherein the second media fingerprint relates to a temporal change of the feature in the first region and the second region.

3. The method as recited in claim 1, wherein the first spatial region and the second spatial region each are spatially homogeneous.

4. The method as recited in claim 1, further comprising the steps of:
sampling one or more components from an Nth spatial region of the media content;
wherein the Nth spatial region is spatially homogeneous; and
wherein the second spatial region comprises an element of the Nth spatial region; and
deriving the first media fingerprint from the components of the first, second, and Nth spatial regions.

5. The method as recited in claim 4 wherein N comprises an integer that has a value greater than two (2).

6. The method as recited in claim 5, further comprising the steps of:
sampling one or more components from an (N−1)-th media content spatial region;
wherein the (N−1)-th spatial region is spatially homogeneous; and
wherein the (N−1)-th spatial region comprises an element of the Nth spatial region; and
deriving the first media fingerprint from the components of the first, second, (N−1)-th, and Nth spatial regions.

7. The method as recited in claim 1 wherein the first spatial region and the second spatial region each have a similar geometric shape.

8. The method as recited in claim 6 wherein the first spatial region incompletely overlaps the second spatial region.

9. The method as recited in claim 7 wherein the first spatial region is centered with respect to the second spatial region.

10. The method as recited in claim 7 wherein the shape comprises at least one of an ellipsoid or an ovoid.

11. The method as recited in claim 10 wherein the ellipsoid conforms to a circular or elliptical configuration; and
wherein a center of:
the circularly configured first spatial region; or
one or more of a major axis or a minor axis of the elliptically configured first spatial region,
is aligned with a center of the media content portion.

12. The method as recited in claim 4 wherein one or more of the second through the Nth spatial regions comprises a spatial projection of the first spatial region, wherein the spatial projection is spatially congruent with respect to the first spatial region, wherein the first and the second through the Nth spatial regions are oriented substantially concentrically with respect to each other.

13. The method as recited in claim 4 wherein the first spatial region comprises a spatial element of the second spatial region; and
wherein one or more of the second spatial region or the (N−1)-th spatial region comprises a spatial element of the Nth spatial region.

14. The method as recited in claim 1 wherein in the step of deriving the first media fingerprint, moment invariants are used that are associated with the components of the first and second spatial region.

15. The method as recited in claim 1 wherein the media fingerprints comprise one or more of:

video fingerprints, which are descriptive in relation to a variation in a feature of an image in the media content over each of the first and second spatial regions; or audio fingerprints, which are descriptive in relation to a variation in a characteristic of a spectrogram associated with the media content portion over each of the first and second spatial regions.

16. The method as recited in claim 1, further comprising the step of:

describing a variation in a motion associated with the media content over each of the first and second spatial regions.

17. The method as recited in claim 4 wherein the step of deriving the first media fingerprint comprises the steps of:

computing a set of statistics that relate to the components sampled from the first spatial region; and further computing a set of statistics that relate to one or more components sampled from each subsequent region through the Nth region.

18. The method as recited in claim 17 wherein the further computing step comprises the steps of:

computing a set of statistics for each of the first through the Nth spatial regions in an order from a spatial region of a smaller area to each of subsequent spatial regions of increasingly larger areas subsequent to the spatial region;

storing the set of statistics as the set of statistics is computed for each of the first through the Nth spatial regions;

upon sampling one or more components of each of the subsequent spatial regions, accessing one or more stored sets of statistics for each of preceding spatial regions of smaller areas; and using the accessed one or more stored sets of statistics in the step of computing the set of statistics for each of subsequent spatial regions of increasing area subsequent to the spatial region.

19. The method as recited in claim 1 wherein the components of the first and the second spatial regions comprise at least one of an intensity element or a color element of the video image or an intensity element or a frequency element of the audio media content portion;

wherein the step of deriving the first media fingerprint comprises the steps of:

generating a histogram representative of the intensity elements, the frequency element or the color element;

measuring the intensity, frequency or color representative histogram over each of the first and second spatial regions; and describing a change in a bin population associated with the histogram over each of the first and second spatial regions.

20. The method as recited in claim 1, further comprising the steps of:

sampling one or more components from the first and second spatial regions up to an Nth spatial region of the media content;

wherein each of the first through the Nth spatial regions is spatially homogeneous;

wherein one or more of the first through the Nth spatial regions comprise an element of one or more others of the first through the Nth spatial regions; and deriving the first media fingerprint from the components of the first through the Nth spatial regions.

21. The method as recited in claim 1, further comprising the steps of:

from an offline training set of frames, collecting a set of matrices from among sampled spatial region components of the training set frames of wherein the training set has a population of 'J' and comprises J matrices;

computing a matrix 'V' from the J matrices wherein the matrix V comprises:

a first dimension 'N' that relates to the number of spatial regions; and a second dimension that relates to the population 'J' of the training set;

wherein a plurality of values in one or more columns of the matrix V are derived from one of the columns of each matrix of the training set;

computing a mean of each of the one or more matrix V columns;

computing one or more differences between the mean and each of the values of each of the columns; and estimating a set of basis vectors in a first dimensional space from the computed one or more differences.

22. The method as recited in claim 21 wherein the estimating step comprises the step of:

factorizing the matrix V.

23. The method as recited in claim 22 wherein the factorizing step comprises at least one of the steps of:

computing a singular value decomposition over the matrix V; or computing a non-negative factorization over the matrix V.

24. The method as recited in claim 21, further comprising the steps of:

projecting a plurality of values that correspond to one or more of a feature or characteristic of two or more of the spatial regions onto one or more of the estimated basis vectors; and determining a variability of the one or more of the feature or the characteristic of the two or more of the spatial regions.

25. The method as recited in claim 1 wherein, in the step of deriving the first media fingerprint, moment invariants are used that are sampled over an arbitrary set of regions of the media content portion.

26. The method as recited in claim 21, further comprising the steps of:

projecting a plurality of values that correspond to one or more of a feature or characteristic of two or more of the spatial regions onto one or more of the estimated basis vectors; and determining a variability of the one or more of the feature or the characteristic of the two or more of the spatial regions.

27. A system, comprising:

means for accessing a portion of media content;

wherein the media content comprises one or more of a video image or an audio spectrogram;

means for sampling one or more components from a first spatial region of the media content;

means for sampling one or more components from a second spatial region of the media content;

wherein the first spatial region overlaps with the second spatial region;

means for deriving a first media fingerprint from the components of the first and the second spatial regions based on one or more of moment invariants, chrominance related values, or luminance related values;

means for generating a difference instance from the media content by comparing a current image derived from the media content and a temporally averaged image derived from the media content;

means for computing a plurality of moment invariants from a set of regions in the difference instance;

means for deriving a second media fingerprint based on the plurality of computed moment invariants; and means for concatenating the first media fingerprint and the second media fingerprint;

wherein means for deriving a first fingerprint further comprises:

means for computing a plurality of pseudo-random vectors that each have dimensions N and M;

means for projecting each of a set of projected matrices onto each of the pseudo-random vectors wherein a plurality of scalar values is derived, each of the scalar values corresponding to one of the projected matrices;

means for computing a threshold that corresponds to a median of the plurality of scalar values; and means for making a comparison of the scalar values and the threshold wherein the first fingerprint is derived based on the comparison.

28. An apparatus or system, comprising:

at least one processor; and a computer readable medium comprising instructions, which when executed by the processor cause the apparatus to perform a process that comprises the steps of:

accessing a portion of media content;

wherein the media content comprises one or more of a video image or an audio spectrogram;

sampling one or more components from a first spatial region of the media content;

sampling one or more components from a second spatial region of the media content;

wherein the first spatial region overlaps with the second spatial region;

deriving a first media fingerprint from the components of the first and the second spatial regions based on one or more of moment invariants, chrominance related values, or luminance related values;

generating a difference instance from the media content by comparing a current image derived from the media content and a temporally averaged image derived from the media content;

computing a plurality of moment invariants from a set of regions in the difference instance;

deriving a second media fingerprint based on the plurality of computed moment invariants; and concatenating the first media fingerprint and the second media fingerprint;

wherein the step of deriving a first fingerprint further comprises the steps of:

computing a plurality of pseudo-random vectors that each have dimensions N and M;

projecting each of a set of projected matrices onto each of the pseudo-random vectors wherein a plurality of scalar values is derived, each of the scalar values corresponding to one of the projected matrices;

computing a threshold that corresponds to a median of the plurality of scalar values; and making a comparison of the scalar values and the threshold wherein the first fingerprint is derived based on the comparison.

29. An integrated circuit (IC) device that is configured or programmed to perform a process, the process comprising:

accessing a portion of media content;

wherein the media content comprises one or more of a video image or an audio spectrogram;

sampling one or more components from a first spatial region of the media content;

sampling one or more components from a second spatial region of the media content;

wherein the first spatial region overlaps with the second spatial region;

deriving a first media fingerprint from the components of the first and the second spatial regions based on one or more of moment invariants, chrominance related values, or luminance related values;

generating a difference instance from the media content by comparing a current image derived from the media content and a temporally averaged image derived from the media content;

computing a plurality of moment invariants from a set of regions in the difference instance;

deriving a second media fingerprint based on the plurality of computed moment invariants; and concatenating the first media fingerprint and the second media fingerprint;

wherein deriving a first fingerprint further comprises:

computing a plurality of pseudo-random vectors that each have dimensions N and M;

projecting each of a set of projected matrices onto each of the pseudo-random vectors wherein a plurality of scalar values is derived, each of the scalar values corresponding to one of the projected matrices;

computing a threshold that corresponds to a median of the plurality of scalar values; and making a comparison of the scalar values and the threshold wherein the first fingerprint is derived based on the comparison.

30. The IC device as recited in claim 29 wherein the IC comprises at least one of a processor, a programmable logic device, a microcontroller, a field programmable gate array, or an application specific IC.

31. A non-transitory computer readable storage medium product comprising tangibly encoded instructions which, when executed by one or more processors, cause the one or more processors to perform a method that comprises the steps of:

accessing a portion of media content;

wherein the media content comprises one or more of a video image or an audio spectrogram;

sampling one or more components from a first spatial region of the media content;

sampling one or more components from a second spatial region of the media content;

wherein the first spatial region overlaps with the second spatial region;

deriving a first media fingerprint from the components of the first and the second spatial regions based on one or more of moment invariants, chrominance related values, or luminance related values;

generating a difference instance from the media content by comparing a current image derived from the media content and a temporally averaged image derived from the media content;

computing a plurality of moment invariants from a set of regions in the difference instance;

deriving a second media fingerprint based on the plurality of computed moment invariants; and concatenating the first media fingerprint and the second media fingerprint;

wherein the step of deriving a first fingerprint further comprises the steps of:

computing a plurality of pseudo-random vectors that each have dimensions N and M;

projecting each of a set of projected matrices onto each of the pseudo-random vectors wherein a plurality of scalar values is derived, each of the scalar values corresponding to one of the projected matrices;

computing a threshold that corresponds to a median of the plurality of scalar values; and making a comparison of the scalar values and the threshold wherein the first fingerprint is derived based on the comparison.

\* \* \* \* \*